(12) United States Patent
Imai et al.

(10) Patent No.: US 9,123,110 B2
(45) Date of Patent: Sep. 1, 2015

(54) VEHICLE ATTITUDE ANGLE CALCULATING DEVICE, AND LANE DEPARTURE WARNING SYSTEM USING SAME

(75) Inventors: Masato Imai, Hitachinaka (JP); Hiroshi Sakamoto, Hitachi (JP); Masao Sakata, Yokohama (JP)

(73) Assignee: Clarion Co., Ltd., Saitama-shi (JP)

( * ) Notice: Subject to any disclaimer, the term of this patent is extended or adjusted under 35 U.S.C. 154(b) by 318 days.

(21) Appl. No.: 13/522,985

(22) PCT Filed: Feb. 9, 2011

(86) PCT No.: PCT/JP2011/052695
§ 371 (c)(1),
(2), (4) Date: Jul. 19, 2012

(87) PCT Pub. No.: WO2011/114814
PCT Pub. Date: Sep. 22, 2011

(65) Prior Publication Data
US 2012/0327233 A1 Dec. 27, 2012

(30) Foreign Application Priority Data

Mar. 17, 2010 (JP) ................. 2010-060106

(51) Int. Cl.
*H04N 7/18* (2006.01)
*G06K 9/00* (2006.01)
(Continued)

(52) U.S. Cl.
CPC .......... *G06T 7/0042* (2013.01); *G06K 9/00798* (2013.01); *G08G 1/167* (2013.01);
(Continued)

(58) Field of Classification Search
USPC ........................................... 348/148
See application file for complete search history.

(56) References Cited

U.S. PATENT DOCUMENTS 5,638,116 A   6/1997  Shimoura et al.
5,987,174 A * 11/1999  Nakamura et al. ............ 382/199
(Continued)

FOREIGN PATENT DOCUMENTS

JP      7-147000 A    6/1995
JP      7-198349 A    8/1995
(Continued)

OTHER PUBLICATIONS

Extended European Search Report dated Dec. 18, 2013 {Ten (10) pages}.
(Continued)

*Primary Examiner* — Jessica M Prince
*Assistant Examiner* — On S Mung
(74) *Attorney, Agent, or Firm* — Crowell & Moring LLP

(57) ABSTRACT

A vehicle attitude angle calculating device finds a yaw angle of a vehicle with reference to a lane stably without using information on a road vanishing point even in the state where a vehicle pitch angle varies. The vehicle attitude angle calculating device includes: a dividing line detection unit that detects a dividing line from image information received from a vehicle-mounted imaging device, the image information being a captured image of an outside of a vehicle; a distance calculation unit that calculates a distance between the dividing line and the optical axis of the vehicle-mounted imaging device every predetermined processing period; and a vehicle angle calculation unit that calculates a dividing line angle based on the calculated distance between the dividing line and the optical axis of the vehicle-mounted imaging device and a vehicle proceeding distance where the vehicle proceeds during a predetermined processing period.

15 Claims, 9 Drawing Sheets

(51) Int. Cl.
  *G05D 1/00*  (2006.01)
  *G08G 1/00*  (2006.01)
  *G06T 7/00*  (2006.01)
  *G08G 1/16*  (2006.01)
  *B60R 11/04*  (2006.01)

(52) U.S. Cl.
  CPC .......... *B60R 11/04* (2013.01); *B60W 2420/403* (2013.01); *B60W 2520/14* (2013.01); *B60Y 2400/3015* (2013.01); *G06T 2207/10016* (2013.01); *G06T 2207/30256* (2013.01); *H04N 7/18* (2013.01)

(56) References Cited

U.S. PATENT DOCUMENTS

| | | | |
|---|---|---|---|
| 6,765,480 B2* | 7/2004 | Tseng | 340/425.5 |
| 2002/0042676 A1* | 4/2002 | Furusho | 701/300 |
| 2003/0043269 A1* | 3/2003 | Park | 348/148 |
| 2003/0103650 A1* | 6/2003 | Otsuka et al. | 382/104 |
| 2004/0042638 A1* | 3/2004 | Iwano | 382/104 |
| 2004/0183663 A1 | 9/2004 | Shimakage | |
| 2005/0270374 A1* | 12/2005 | Nishida et al. | 348/148 |
| 2007/0041614 A1* | 2/2007 | Tanji | 382/104 |
| 2007/0069874 A1* | 3/2007 | Huang et al. | 340/435 |
| 2007/0225913 A1* | 9/2007 | Ikeda et al. | 701/223 |
| 2008/0027627 A1* | 1/2008 | Ikeda et al. | 701/117 |
| 2008/0091327 A1 | 4/2008 | Tsuchiya et al. | |
| 2008/0238718 A1* | 10/2008 | Jung | 340/901 |
| 2010/0054538 A1* | 3/2010 | Boon | 382/104 |
| 2010/0079590 A1* | 4/2010 | Kuehnle et al. | 348/118 |
| 2010/0189306 A1* | 7/2010 | Kageyama et al. | 382/104 |
| 2011/0074955 A1* | 3/2011 | Kuehnle | 348/148 |
| 2011/0115912 A1* | 5/2011 | Kuehnle | 348/148 |
| 2012/0226392 A1* | 9/2012 | Kataoka | 701/1 |

FOREIGN PATENT DOCUMENTS

| | | |
|---|---|---|
| JP | 2001-175999 A | 6/2001 |
| JP | 2001-266163 A | 9/2001 |
| JP | 2002-117391 A | 4/2002 |
| JP | 2005-346383 A | 12/2005 |
| JP | 2008-33807 A | 2/2008 |
| JP | 2008-87726 A | 4/2008 |
| JP | 2009-181310 A | 8/2009 |

OTHER PUBLICATIONS

Xiao, X et al., A study on lane departure detection method based on vision and TLC concept, Database Compendex, Jan. 2010, Abstract, Engineering Information, Inc., New York, NY, USA, XP002717355, Database accession No. E20101712884710.
International Search Report dated Mar. 22, 2011 (Two (2) pages).
Form PCT/ISA/237 dated Mar. 22, 2011 (Four (4) pages).

* cited by examiner

FIG. 4
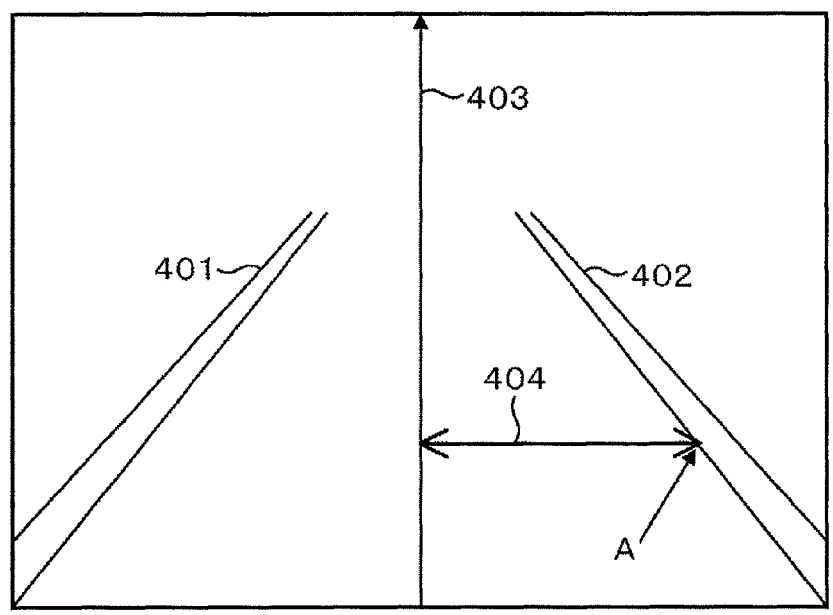
(a)
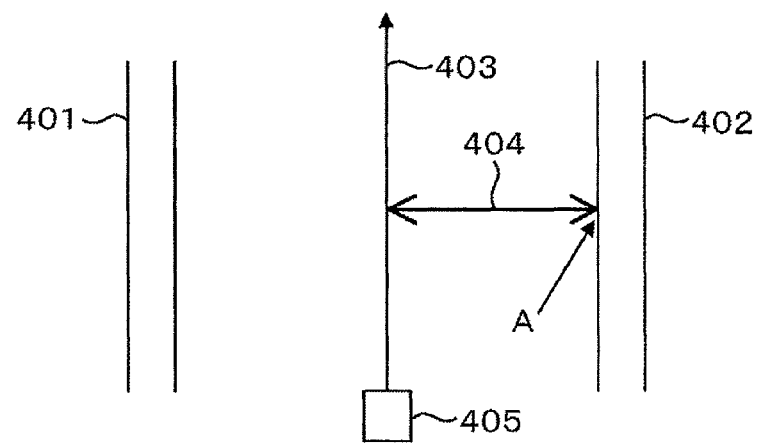
(b)

VEHICLE ATTITUDE ANGLE CALCULATING DEVICE, AND LANE DEPARTURE WARNING SYSTEM USING SAME

TECHNICAL FIELD

The present invention relates to a method of calculating a vehicle attitude angle with reference to a lane during traveling using a vehicle-mounted camera.

BACKGROUND ART

Various techniques have been proposed to capture an image of the surrounding of a vehicle using a vehicle-mounted camera and recognize objects (such as vehicles and pedestrians) and road markings and signs (paint on a road surface such as dividing lines and signs such as stop) in the captured image. For example, if a dividing line as paint on a road can be recognized using a vehicle-mounted camera and a vehicle position in a lane can be found, then warning can be issued to a driver when the vehicle departs from the lane or a steering and a brake can be controlled to suppress the departure.

As such a system issuing warning when a vehicle departs from a lane, lane departure warning systems (LDWS) specified by JIS D 0804 of JIS (Japanese Industrial Standard) are available. In order to implement this standard using a vehicle-mounted camera configured to capture an image in the rear of a vehicle and recognize a dividing line in the captured image, information on a dividing line recognized in the rear of the vehicle has to be corrected to be that at a position of front wheels of the vehicle. To this end, a yaw angle of the vehicle with reference to a lane has to be found precisely as information to be used for the correction.

For instance, Patent Document 1 discloses a device configured to find a road vanishing point that is a point where two parallel road lines cross each other and vanish in an image captured by a vehicle-mounted camera and to calculate an attitude parameter (attitude angle (yaw angle)) of the vehicle-mounted camera on the basis of these two parallel road lines and the road vanishing point.

Patent Document 1: JP Patent Publication (Kokai) No. 07-147000 A (1995)

DISCLOSURE OF THE INVENTION

Problem to be Solved by the Invention

In Patent Document 1, however, it would be difficult to find a road vanishing point if a traveling road is not linear nor flat, and even when a road vanishing point can be found, a relationship between the road vanishing point and the road parallel lines will vary with a change in vehicle pitch angle (due to a change in the number of passengers, fuel consumption or the like), and so an error will occur in the vehicle yaw angle with reference to a lane.

It is an object of the present invention to provide a vehicle attitude angle calculating device capable of finding a vehicle yaw angle with reference to a lane stably without using information on a road vanishing point even in the state where a vehicle pitch angle varies.

Means for Solving the Problem

In order to cope with the aforementioned problems, a vehicle attitude angle calculating device of the present invention includes: a dividing line detection unit that detects a dividing line from image information received from a vehicle-mounted imaging device having an optical axis, the image information being a captured image of an outside of a vehicle; a distance calculation unit that calculates a distance between the dividing line and the optical axis of the vehicle-mounted imaging device every predetermined processing period; and a vehicle angle calculation unit that calculates a dividing line angle on the basis of the calculated distance between the dividing line and the optical axis of the vehicle-mounted imaging device and a vehicle proceeding distance where the vehicle proceeds during a predetermined processing period.

Effects of the Invention

According to the present invention, a vehicle attitude angle calculating device can be provided, capable of finding a vehicle yaw angle with reference to a lane stably without using information on a road vanishing point even in the state where a vehicle pitch angle varies.

BRIEF DESCRIPTION OF THE DRAWINGS

FIG. 4 schematically shows the processing by a distance-to-dividing line calculation unit of the present invention.

BEST MODE FOR CARRYING OUT THE INVENTION

The following describes embodiments in detail with reference to the drawings.

Figure 1:
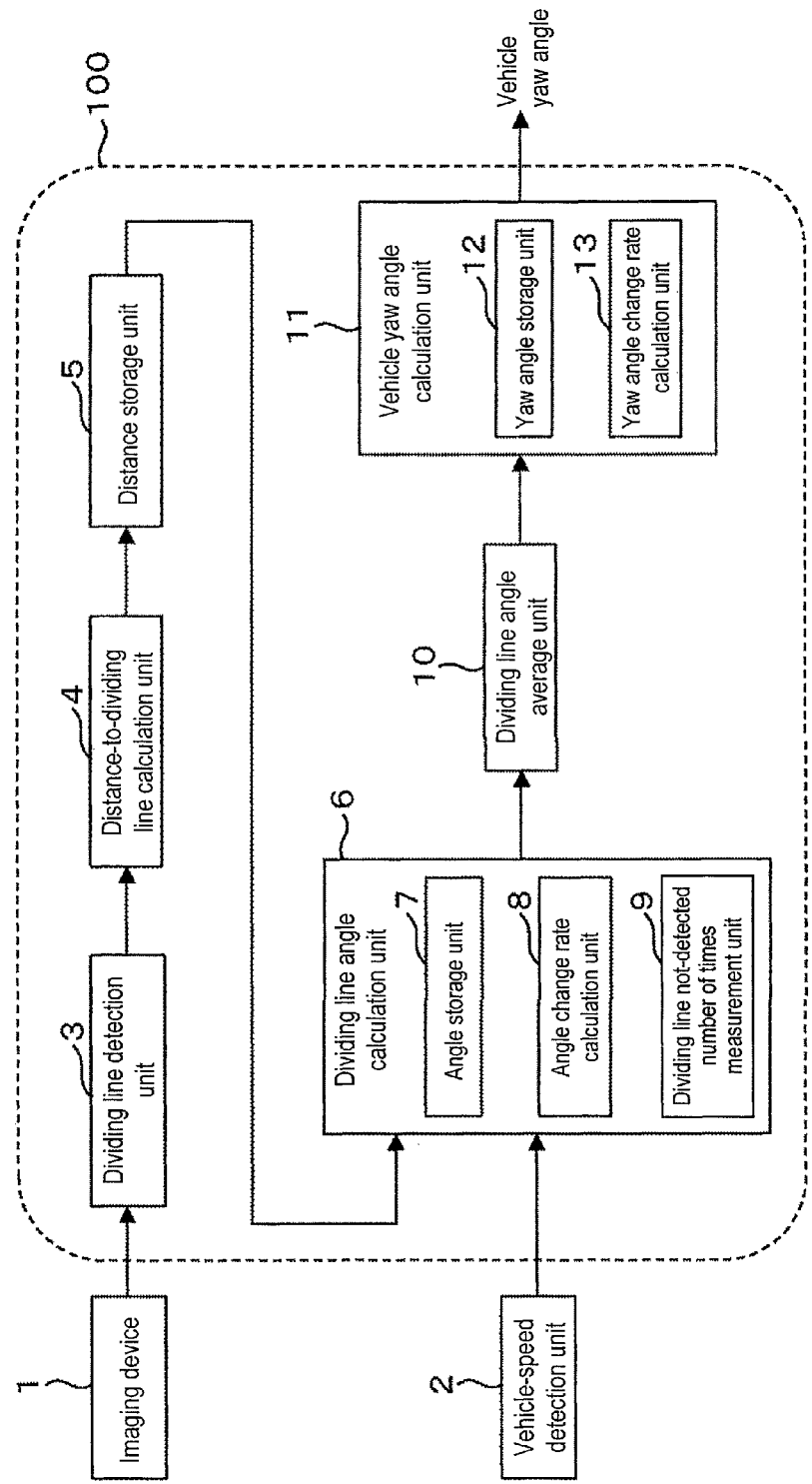
FIG. 1 schematically illustrates Embodiment 1 of a vehicle attitude angle calculating device according to the present invention.

FIG. 1 schematically illustrates a vehicle attitude angle calculating device 100 according to Embodiment 1.

To begin with, the configuration of and the processing by the vehicle attitude angle calculating device 100 are described.

The vehicle attitude angle calculating device 100 includes a dividing line detection unit 3, a distance-to-dividing line calculation unit 4, a distance storage unit 5, a dividing line angle calculation unit 6, an angle storage unit 7, an angle change rate calculation unit 8, a dividing line non-detection number of times measurement unit 9, a dividing line angle average unit 10, a vehicle yaw angle calculation unit 11, a yaw angle storage unit 12 and a yaw angle change rate calculation unit 13, and is programmed on a computer not illustrated in the vehicle attitude angle calculating device 100 and is repeatedly executed with a predetermined period.

The vehicle attitude angle calculating device 100 is further configured to receive an image captured by an imaging device 1 as an input as well as a vehicle speed detected by a vehicle-speed detection unit 2 as an input to output a vehicle yaw angle with reference to a lane or the like externally.

The imaging device 1 captures an image of an outside of the vehicle using image sensor elements such as a CCD (Charge Coupled Device) image sensor or a CMOS (Complementary Metal Oxide Semiconductor) image sensor and applies digital processing to the captured image to convert it into image data that can be dealt with by a computer.

The vehicle-speed detection unit 2 detects a speed that the vehicle proceeds, which may be configured, for example, to detect a vehicle speed by averaging values obtained through wheel-speed sensors attached to front-and-rear and left-and-right wheels of the vehicle or to calculate a vehicle speed by integrating values of acceleration of the vehicle that are obtained by an acceleration sensor mounted on the vehicle.

The dividing line detection unit 3 detects a dividing line (a pair of left and right lines residing on the left and right of the vehicle, a lane edge line or the like) that is paint on a road using image data (image information) obtained by capturing an image outside the vehicle with the vehicle-mounted imaging device 1.

The distance-to-dividing line calculation unit 4 calculates a distance (distance to dividing line) between the dividing line detected by the dividing line detection unit 3 and an optical axis of the imaging device 1. This calculation is performed a plurality of times with a predetermined processing period.

The distance storage unit 5 stores a past plurality of distances to a dividing line calculated by the distance-to-dividing line calculation unit 4. Typical examples of a storage medium therefore include a RAM (Random Access Memory) inside a computer.

The dividing line angle calculation unit 6 includes the angle storage unit 7, the angle change rate calculation unit 8 and the dividing line non-detection number of times measurement unit 9, and uses a past plurality of distances to a dividing line stored in the distance storage unit 5 and a detected vehicle speed (or a vehicle proceeding distance during a calculation period found from the vehicle speed) to calculate a dividing line angle.

The angle storage unit 7 stores a past plurality of dividing line angles calculated by the dividing line angle calculation unit 6. Similarly to the distance storage unit 5, typical examples of a storage medium therefore include a RAM (Random Access Memory) inside a computer.

The angle change rate calculation unit 8 calculates a rate of change of dividing line angles using the past plurality of dividing line angles stored in the angle storage unit 7.

The dividing line non-detection number of times measurement unit 9 measures the number of times (non-detection counter) when the distance-to-dividing line calculation unit 4 continuously fails to calculate a distance to a dividing line.

When the distance-to-dividing line calculation unit 4 calculates a plurality of distances to a dividing line, the dividing line angle calculation unit 6 also calculates a plurality of dividing line angles. Therefore, the dividing line angle average unit 10 averages these plurality of dividing line angles. Herein, when the distance-to-dividing line calculation unit 4 calculates only one distance to a dividing line for one dividing line, the averaging processing by the dividing line angle average unit 10 is not performed and the value is directly output.

The vehicle yaw angle calculation unit 11 calculates a yaw angle of the vehicle with reference to the dividing line on the basis of the calculated dividing line angle. More specifically, the dividing line angle subjected to averaging by the dividing line angle average unit 10 is converted into a yaw angle of the vehicle with reference to a lane. The vehicle yaw angle calculation unit 11 further may predict a current yaw angle of the vehicle using a rate of change of the vehicle yaw angle.

The yaw angle storage unit 12 stores a past plurality of yaw angles of the vehicle calculated by the vehicle yaw angle calculation unit 11. Similarly to the distance storage unit 5 and the angle storage unit 7, typical examples of a storage medium therefore include a RAM (Random Access Memory) inside a computer.

The yaw angle change rate calculation unit 13 uses the past plurality of yaw angles of the vehicle stored in the yaw angle storage unit 12 to calculate a rate of change of the yaw angle of the vehicle.

Note here that the dividing line angle calculation unit 6, the dividing line angle average unit 10 and the vehicle yaw angle calculation unit 11 make up a vehicle angle calculation unit, and an output from the vehicle angle calculation unit shows a yaw angle of the vehicle. Depending on conditions, however, the dividing line angle calculated by the dividing line angle calculation unit 6 and the yaw angle of the vehicle calculated by the vehicle yaw angle calculation unit 11 may be the same. In that case, the dividing line angle is directly output from the vehicle angle calculation unit as a yaw angle of the vehicle.

Next the following describes the processing by the vehicle attitude angle calculating device as a whole.

Figure 2:
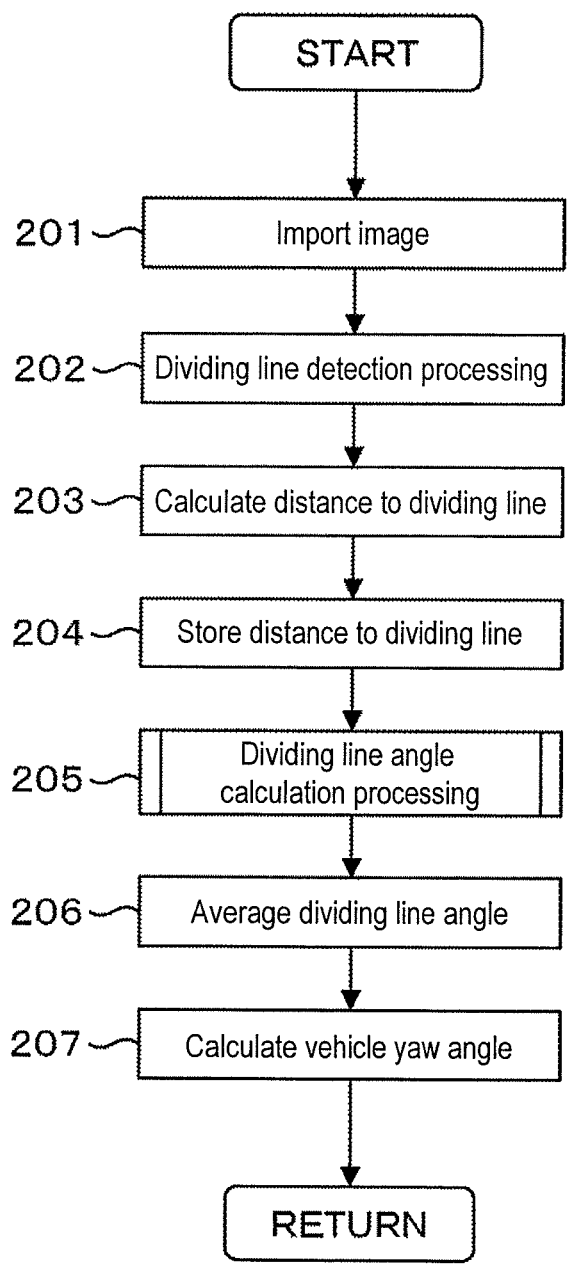
FIG. 2 is a flowchart showing the processing by the vehicle attitude angle calculating device according to the present invention.

FIG. 2 is a flowchart showing the processing by the vehicle attitude angle calculating device 100.

Firstly, at Step 201, digital processing is applied to an image captured by the imaging device 1, and the resultant is imported as image data.

Figure 3:
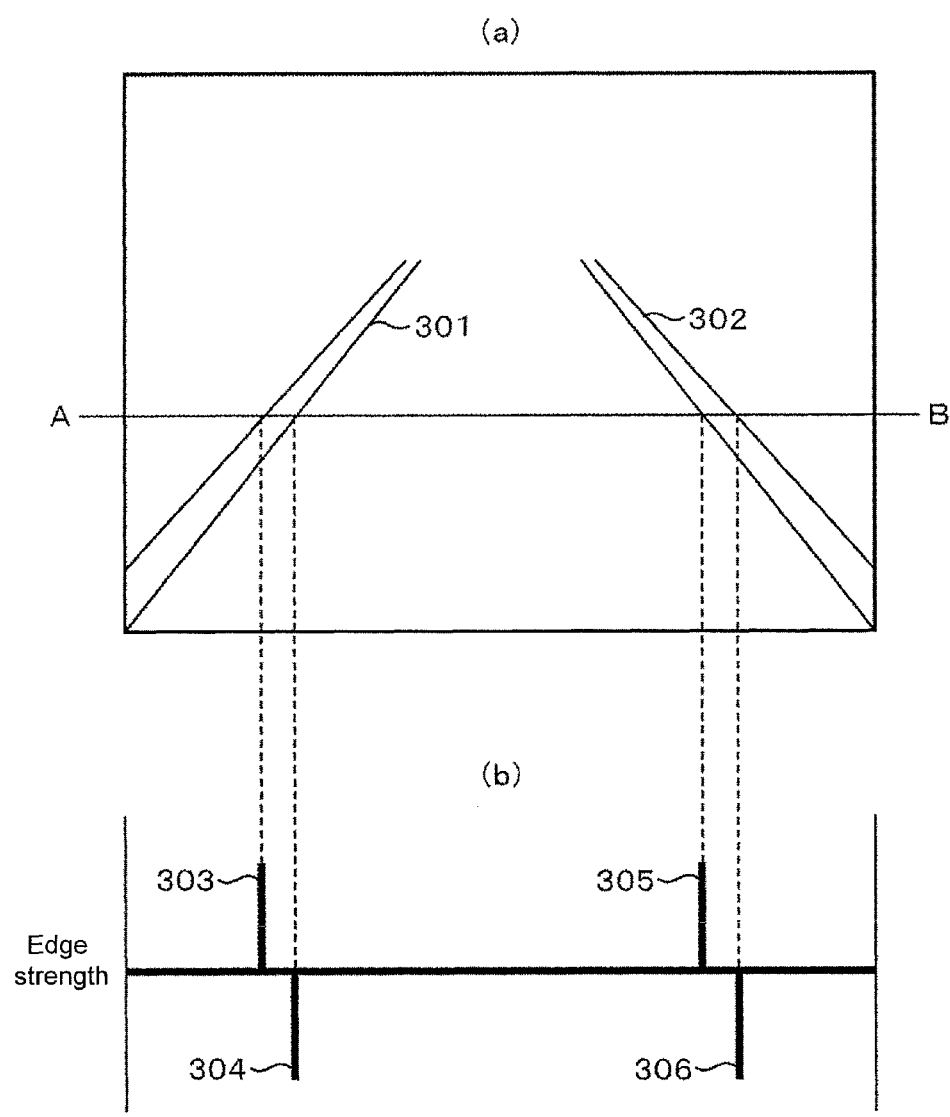
FIG. 3 schematically shows the processing by a dividing line detection unit of the present invention.

Then, at Step 202, a dividing line that is paint on a road is detected from the image data imported at Step 201 by the dividing line detection unit 3. Referring to FIG. 3, a method of detecting the dividing line is specifically described below. FIG. 3(*a*) shows image data imported at Step 201 where two dividing lines 301 and 302 exist. As one method to detect these dividing lines, there is a method to extract a dividing line by calculating edge strength in the image. An edge herein refers to a point where a brightness value abruptly changes in the image. FIG. 3(*b*) shows a result of detecting edge strength from A to B of FIG. 3(*a*), where peaks 303 and 305 are points of a change from a road to a dividing line (a point where the brightness value abruptly changes from dark to bright), and peaks 304 and 306 are points of a change from a dividing line to a road (a point where the brightness value abruptly changes from bright to dark). In this way, a combination of 303 and 304 or a combination of 305 and 306 is found, whereby a dividing line can be detected.

Next at Step 203, a distance from the dividing line detected at Step 202 to the optical axis of the imaging device 1 (a distance to a dividing line) is calculated by the distance-to-dividing line calculation unit 4. Referring to FIG. 4, a method of calculating the distance to the dividing line is specifically described below. Similarly to FIG. 3(*a*), FIG. 4(*a*) shows image data imported at Step 201, and FIG. 4(*b*) is a plan view viewed from the above in the same state as FIG. 4(*a*). In this example, two dividing lines 401 and 402 exist, and an arrow 403 denotes the optical axis of the imaging device 1 and 405 denotes the imaging device 1. For example, as indicated by an arrow 404, a distance to the dividing line 402 is a distance from the optical axis 403 to point A of the dividing line 402, and the distance may be calculated by finding coordinates of point A on FIG. 4(*a*) using the peak of the edge strength and converting the same into the actual coordinate system of FIG.

4(b). Instead of using coordinates inside the dividing line as a distance to the dividing line, coordinates outside the dividing line or at the center of the dividing line may be used as long as they follow the same definition consistently. A distance to a dividing line calculated may not be one for each dividing line in an image but a plurality of (e.g., 10) distances for each dividing line.

Next at Step 204, the distance to the dividing line calculated at Step 203, a detected vehicle speed and a vehicle proceeding distance during a calculation period are stored in a RAM inside a computer by the distance storage unit 5. In this example, a past plurality of times (e.g., past 10 times) processing results are stored. Herein, when a plurality of distances to a dividing line are calculated at Step 203, each of the plurality of distances is stored a plurality of times in the past.

Figure 5:
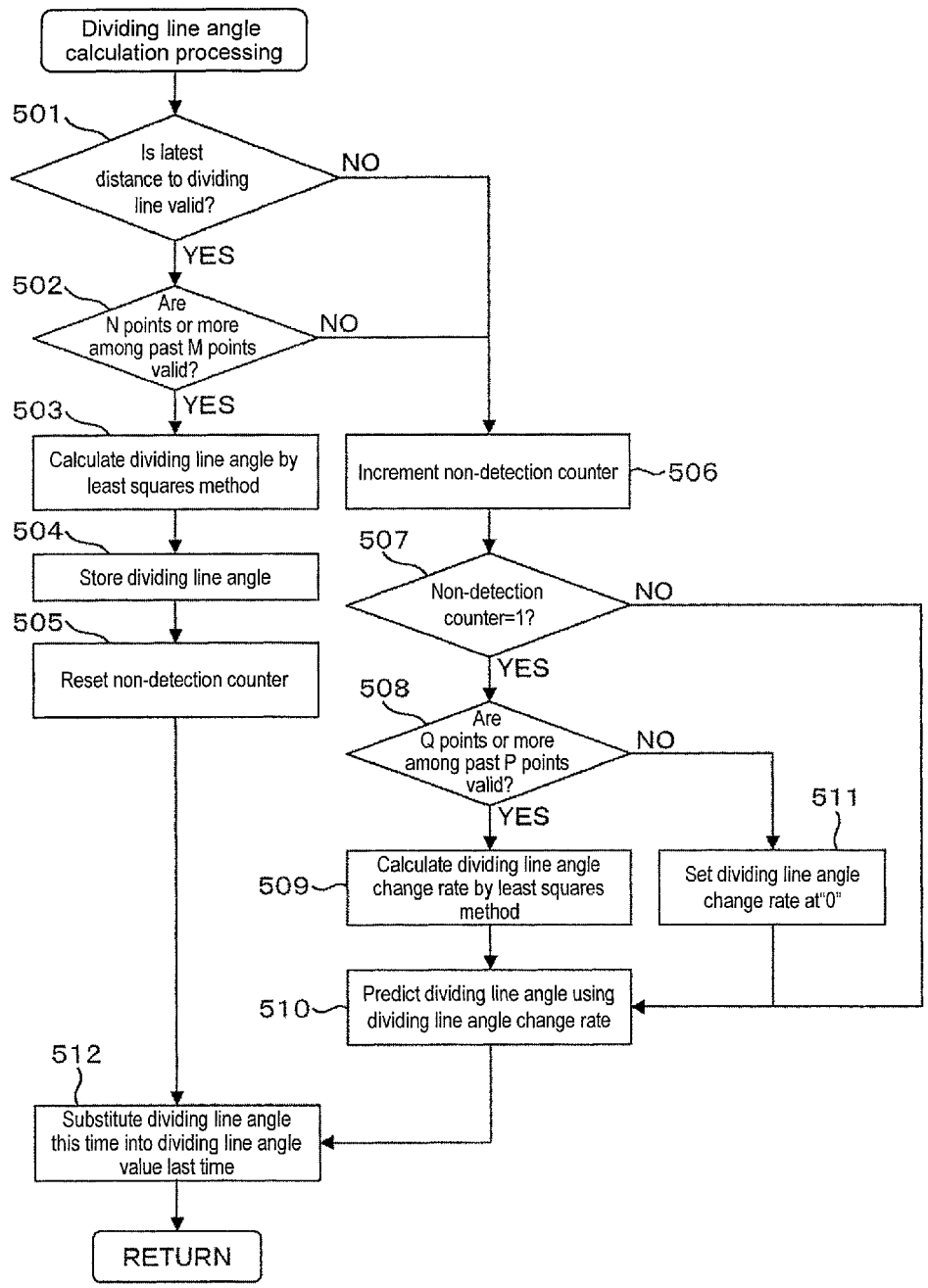
FIG. 5 is a flowchart showing the processing by a dividing line angle calculation processing of the present invention.

Next at Step 205, a dividing line angle is calculated by the dividing line angle calculation unit 6 using the past plurality of distances to a dividing line stored at Step S204. Referring to FIG. 5, specific processing is described below. Herein when a plurality of distances to a dividing line are calculated at Step 203, a dividing line angle is calculated for each of the plurality of distances.

Firstly at Step 501, determination is made as to whether, among the past plurality of distances to a dividing line stored at Step 204, a latest distance to a dividing line is valid or not, i.e., whether the latest distance has been calculated or not. When the latest distance to the dividing line is valid, the procedure proceeds to Step 502. On the other hand, when the latest distance to the dividing line is not valid, the procedure proceeds to Step 506. Herein, a valid latest distance to a dividing line refers to the case where a distance to a dividing line has been calculated at Step 203, and when a type of a dividing line is broken, such as a broken line or a dotted line, a distance to a dividing line may not be calculated.

At Step 502, determination is made as to whether, among the past plurality of distances to the dividing line stored at Step S204, N points or more are valid or not among M points when they are counted from the latest value (e.g., four points or more among eight points), i.e., whether a first predetermined number of plurality of distances or more have been calculated or not. When N points or more are valid among M points (when it is determined that calculation of the predetermined number or more has been performed), the procedure proceeds to Step 503, and when N points or more are not valid among M points, the procedure proceeds to Step 506. Herein M and N may be determined in advance and stored in a storage device or the like.

Figure 6:
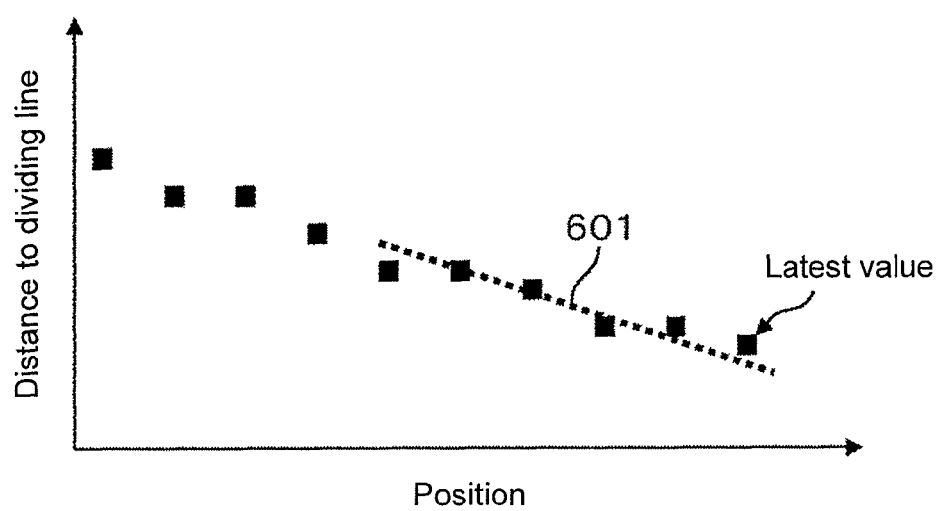
FIG. 6 shows an exemplary method to calculate a dividing line angle of the present invention.

At Step 503, a dividing line angle is calculated using valid values of the distance to the dividing line determined at Step 502. More specifically, as shown in FIG. 6, a regression line 601 is found by a least squares method using past six points counted from the latest value of the distance to a dividing line to calculate the dividing line angle. The horizontal axis of this graph represents a position (a vehicle proceeding distance during calculation period), which can be found by the vehicle speed and the calculation period.

Next at Step 504, the dividing line angle calculated at Step 503 is stored in a RAM inside a computer by the angle storage unit 7.

Next at Step 505, a non-detection counter that is incremented when the calculation of a distance to a dividing line fails at Step 203 is reset, and at Step 512, the dividing line angle φ calculated at Step 503 is substituted into the last value φ_z of the dividing line angle to complete the series of processing.

At Step 506, the non-detection counter that is incremented when the calculation of a distance to a dividing line fails at Step 203 is incremented.

Next at Step 507, determination is made as to whether the non-detection counter shows 1 or not. When the non-detection counter shows 1, the procedure proceeds to Step 508, and when the non-detection counter does not show 1, the procedure proceeds to Step 510.

At Step 508, determination is made as to whether, among the past plurality of dividing line angles stored at Step S504, Q points or more are valid among P points when they are counted from the latest value (e.g., three points or more among six points), i.e., whether a predetermined number of plurality of dividing line angles or more have been calculated or not in the past. When Q points or more are valid among P points (when it is determined that calculation of a predetermined second number or more has been performed), the procedure proceeds to Step 509, and when Q points or more are not valid among P points, the procedure proceeds to Step 511. Herein P and Q may be determined in advance and stored in a storage device or the like.

At Step 509, a rate of change of the dividing line angles (a value obtained by differentiation of the dividing line angle with a vehicle proceeding distance during calculation period) is calculated using valid values of the dividing line angle determined at Step 508. More specifically, similarly to the method described in FIG. 6, the vertical axis is replaced with the dividing line angle, and a regression line is found by a least squares method or the like to calculate a rate of change of the dividing line angles.

At Step 511, the rate of change of the dividing line angles is set at 0.

Herein a distinction between Step 509 and Step 511 is based on the number of valid values of the dividing line angle determined at Step 508, and this is because the lack of a predetermined number or more (i.e., three points or more) of dividing line angles to calculate the rate of change of the dividing line angles degrades the reliability of a calculation result of the rate of change of the dividing line angles.

Next at Step 510, using the rate of change of the dividing line angles calculated at Step 509 or Step 511, a dividing line angle is predicted. More specifically, the dividing line angle φ can be calculated by Expression (1) using the last value of the dividing line angle φ_z, the rate of change of the dividing line angles α and the calculation period Δt.

[Expression 1]

$$\phi = \phi_z + \alpha \times \Delta t \tag{1}$$

Finally at Step 512, the dividing line angle φ calculated at Step 510 is substituted into the last value of the dividing line angle φ_z to complete the series of processing.

Subsequently at Step 206, when a plurality of dividing line angles are calculated at Step 205, these plurality of dividing line angles are averaged by the dividing line angle average unit 10. As a specific method for this, (a) arithmetic average, (b) arithmetic weighted average based on distance resolution of the imaging device and (c) arithmetic weighted average based on the degree of freshness of information are available, each of which may be combined. The following describes (a) to (c) specifically.

(a) Arithmetic Average

For instance, when four dividing line angles φ1, φ2, φ3 and φ4 are calculated, the average value φave of the dividing line angle can be calculated by Expression (2):

[Expression 2]

$$\phi ave=(\phi 1+\phi 2+\phi 3+\phi 4)\div 4 \quad (2).$$

(b) Arithmetic Weighted Average Based on Distance Resolution of Imaging Device

An imaging device has a character that distance resolution thereof is degraded as a position on an image becomes farther from the imaging device. For instance, when four dividing line angles $\phi 1$, $\phi 2$, $\phi 3$ and $\phi 4$ are calculated and when distance resolution in the horizontal direction at their calculation positions are 1 cm, 2 cm, 3 cm and 4 cm, respectively, then the average $\phi ave$ of the dividing line angle can be calculated by Expression (3) using their reciprocals (1, ½, ⅓, ¼) as the weight:

[Expression 3]

$$\phi ave=(1\times\phi 1+½\times\phi 2+⅓\times\phi 3+¼\times\phi 4)\div(1+½+⅓+¼) \quad (3).$$

(c) Arithmetic Weighted Average Based on Degree of Freshness of Information

When the determination at Step 501 and Step 502 results in NO, the current dividing line angle is predicted using the rate of change of the dividing line angles. However, as the non-detection counter that is incremented at Step 506 shows a larger number, an error of the prediction will be accumulated more. That is, since a large value of the non-detection counter means decline of the freshness of information, arithmetic weighted average based on the value of the non-detection counter is effective. For instance, when four dividing line angles $\phi 1$, $\phi 2$, $\phi 3$ and $\phi 4$ are calculated and when their non-detection counters show the value of 0, 1, 2 and 3, respectively, the average value $\phi ave$ of the dividing line angles can be calculated as in Expression (4) using the values (20, 19, 18, 17) obtained by subtracting the values of the non-detection counter from a predetermined value (e.g., 20) as the weight. Herein, when the weight becomes 1 or less, it may be replaced with 1:

[Expression 4]

$$\phi ave=(20\times\phi 1+19\times\phi 2+18\times\phi 3+17\times\phi 4)\div(20+19+18+17) \quad (4).$$

When (b) and (c) are combined, an average may be calculated by multiplying the respective found weights, or an arithmetic average may be calculated after finding the weights individually.

Finally at Step 207, a yaw angle of the vehicle with reference to a lane is calculated by the vehicle yaw angle calculation unit 11 using the dividing line angle calculated at Step 206 to complete the series of processing. When the vehicle is travelling in a lane of a road, two dividing lines will be detected at Step 202, and the angles for the two dividing lines will be calculated at Step 206. Therefore, a yaw angle of the vehicle with reference to the lane is calculated using the angles for the two dividing lines. Basically the yaw angle of the vehicle can be calculated by averaging the angles for the two dividing lines. However, an average may be calculated by adding weights to the angles for the two dividing lines. When one dividing line only is detected, the angle of the dividing line may be the yaw angle of the vehicle. Since at Step 205 the dividing line angle is calculated using the past information, the yaw angle of the vehicle may include time delay. To cope with this, yaw angles of the vehicle may be retroactively stored by the yaw angle storage unit 12 and a rate of change of the yaw angle of the vehicle may be calculated by the yaw angle change rate calculation unit 13 using the stored past plurality of yaw angles of the vehicle, and a future value may be predicted using this rate of change of the yaw angle of the vehicle with consideration given to the time delay. This can solve the time delay due to the usage of past information.

Herein at Step 202, when any dividing line cannot be detected even after the vehicle travels for a predetermined time (e.g., 5 seconds) or in a predetermined distance (e.g., 20 m), the calculation of Step 203 or later is stopped and a notice may be given to report that the current yaw angle of the vehicle cannot be calculated.

As described above, using a past plurality of distances to a dividing line, a yaw angle of a vehicle with reference to a lane can be calculated on the basis of a change of a relative distance, and therefore a vehicle yaw angle with reference to a lane can be found stably even in the state where a vehicle pitch angle varies. Further a plurality of distances to a dividing line are calculated and dividing line angles are calculated corresponding thereto and are averaged, whereby a vehicle yaw angle with reference to a lane can be calculated more stably.

Next, the following describes an embodiment where the output from the vehicle attitude angle calculating device according to the present invention is applied to another system.

Figure 7:
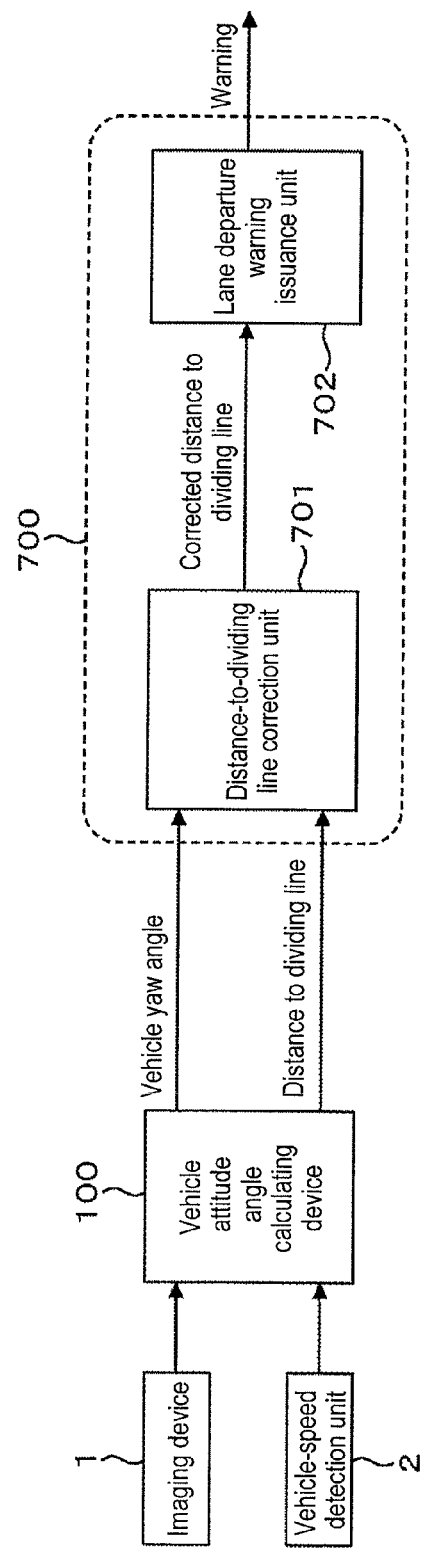
FIG. 7 schematically illustrates a lane departure warning system using the vehicle attitude angle calculating device according to the present invention.

FIG. 7 schematically illustrates a lane departure warning system in the case where the output from the vehicle attitude angle calculating device 100 according to Embodiment 1 is applied to a lane departure warning device 700. Herein the image-capturing direction of the imaging device 1 in the present embodiment is the rearward of the vehicle.

To begin with, the configuration of and the processing by the lane departure warning device 700 are described.

The lane departure warning device 700 includes a distance-to-dividing line correction unit 701 and a lane departure warning issuance unit 702, and is programmed on a computer not illustrated in the lane departure warning device 700 and is repeatedly executed with a predetermined period. Herein, it is assumed that the lane departure warning in this example conforms to JIS standard (JIS D 0804). That is, the lane departure warning device 700 determines the necessity of issuance of warning on lane departure on the basis of the vehicle yaw angle the distance between the dividing line and the optical axis of the vehicle-mounted imaging device input from the vehicle attitude angle calculating device 100.

The distance-to-dividing line correction unit 701 receives the vehicle yaw angle and the distance to the dividing line calculated by the vehicle attitude angle calculating device 100 as an input to correct the distance to the dividing line. Herein, according to JIS standard, the necessity of issuance of warning is determined on the basis of a distance between the outside of a front wheel of the vehicle and a dividing line, and therefore the distance to a dividing line detected from the image in the rear of the vehicle captured by the imaging device 1 has to be corrected to a distance from the outside of a front wheel of the vehicle to the dividing line. This is described more specifically with reference to FIG. 8.

Figure 8:
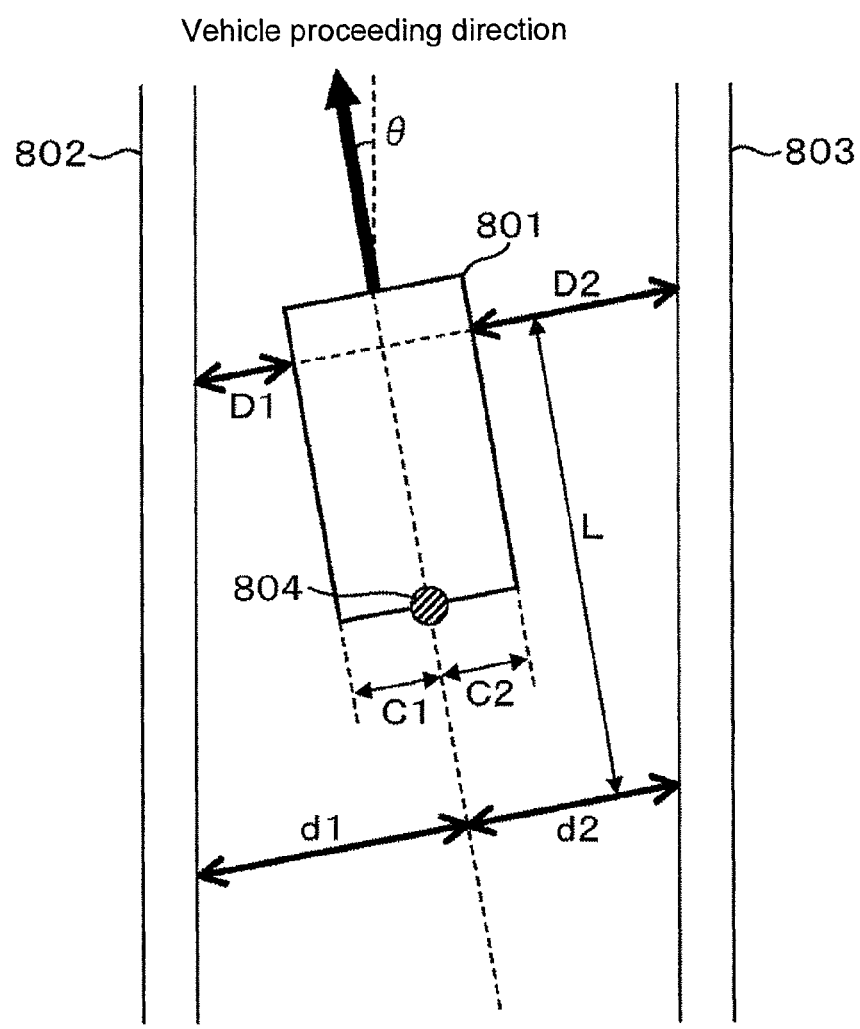
FIG. 8 is a schematic view to describe a distance-to-dividing line correction unit of the present invention.

FIG. 8 assumes the case where a vehicle 801 travels on a road where two dividing lines 802 and 803 exist.

In order to correct distance d1 to a left dividing line calculated by an imaging device 804 installed at a rear part of the vehicle into distance D1 from the outside of the left front wheel of the vehicle to the left dividing line (corrected distance to dividing line), calculation may be performed by Expression (5) using distance L from the position where distance d1 to the left dividing line is calculated to the vehicle front wheel, distance Cl from the imaging device 804 to the outside of the left front wheel of the vehicle and the vehicle yaw angle θ:

[Expression 5]

$$D1 = d1 - L \times \tan\theta - C1 \qquad (5).$$

Similarly, in order to correct distance d2 to a right dividing line calculated by the imaging device 804 installed at a rear part of the vehicle into distance D2 from the outside of the right front wheel of the vehicle to the right dividing line (corrected distance to dividing line), calculation may be performed by Expression (6) using distance L from the position where distance d2 to the right dividing line is calculated to the vehicle front wheel, distance C2 from the imaging device 804 to the outside of the right front wheel of the vehicle and the vehicle yaw angle θ:

[Expression 6]

$$D2 = d2 + L \times \tan\theta - C2 \qquad (6).$$

When the vehicle departs (or is about to depart) from the lane, the lane departure warning issuance unit 702 issues warning to a passenger using the distances D1 and D2 to the left and right dividing lines that are corrected by the distance-to-dividing line correction unit 701. That is, when either of the distance from the outside of the vehicle front wheel to the left dividing line or the distance from the outside of the vehicle front wheel to the right dividing line is a predetermined distance or less, a flag is set to issue lane departure warning. The warning may be issued with voice from a speaker or may be displayed on a display. As a specific method, when the corrected distance to the dividing line D1 or D2 is within a predetermined range (e.g., within 5 cm), warning is issued. In one method, the warning may be called off after the elapse of a predetermined time (e.g., after 2 seconds) since the issuance of warning.

Figure 9:
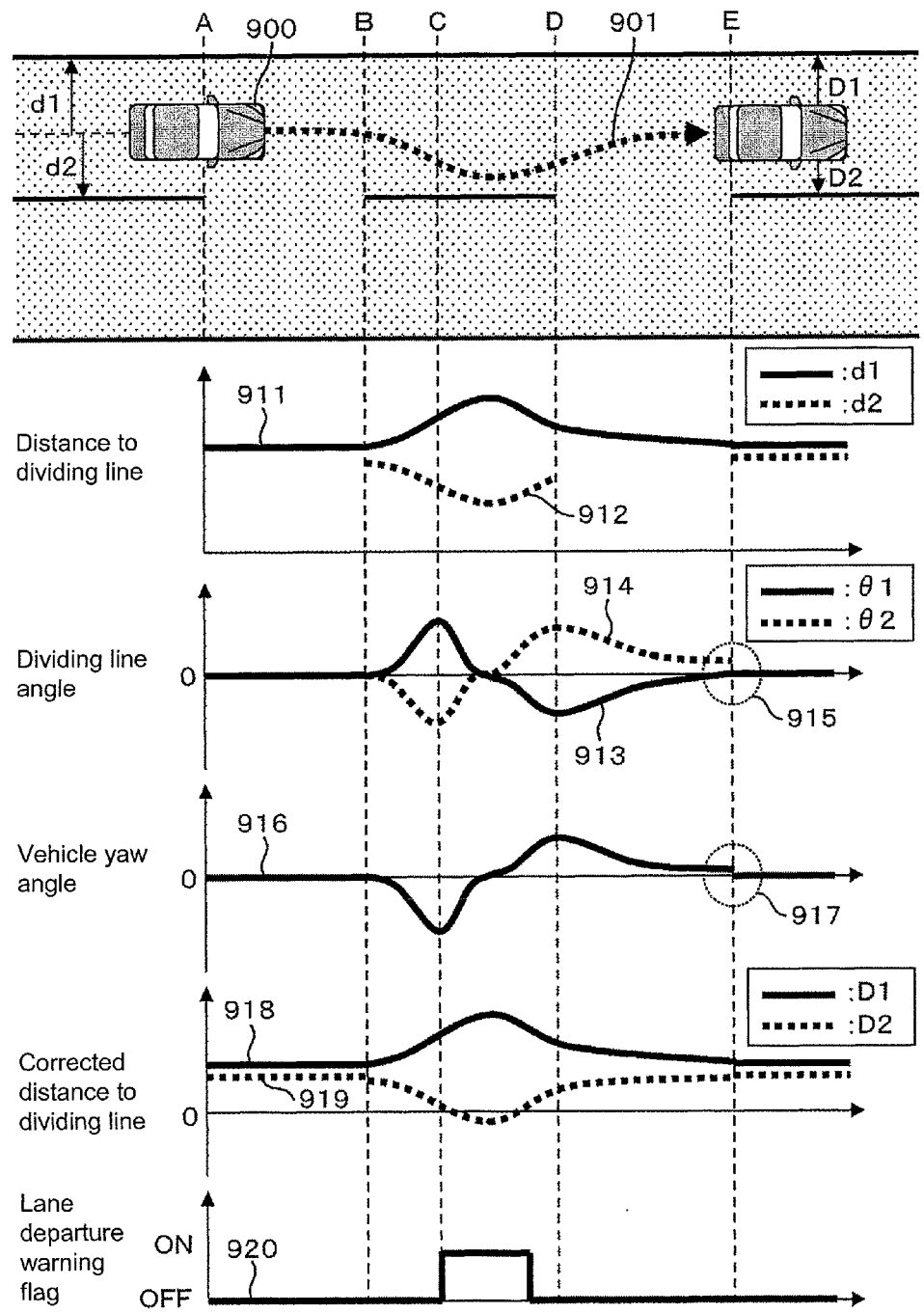
FIG. 9 shows a specific example of the processing by the lane departure warning system according to the present invention.

Referring next to FIG. 9, a series of processing by the vehicle attitude angle calculating device 100 and the lane departure warning device 700 is described, while adapting that to an actual road condition.

FIG. 9 assumes the case where a vehicle 900 traveling at a left lane of a road with two lanes each way is about to depart to a right lane while following a path indicated with a dotted line 901 and then returns to the left lane again. Assume that a dividing line at a road boundary is painted as a solid line and a dividing line at a lane boundary is painted as a broken line, a distance to a dividing line on the left side of the vehicle is d1, a distance to a dividing line on the right side of the vehicle is d2, a corrected distance to the dividing line on the left side of the vehicle is D1 and a corrected distance to the dividing line on the right side of the vehicle is D2. The image-capturing direction of the vehicle-mounted imaging device is the rearward of the vehicle.

Firstly the distances to dividing lines d1 and d2 are calculated as in a solid line 911 and a dotted line 912, respectively. Herein, section from A to B and section from D to E are sections where the dividing line on the right side of the vehicle cannot be detected because the dividing line is a broken line, and therefore the value of the distance to the dividing line d2 as the dotted line 912 is indefinite.

Next dividing line angles θ1 (dividing line angle on the left side of the vehicle) and θ2 (dividing line angle on the right side of the vehicle) are calculated as in a solid line 913 and a dotted line 914 using time-series data of the distances to dividing lines d1 and d2, respectively. As for the dividing line angle θ1, since the distance to the dividing line d1 can be calculated continuously, a past plurality of distances to the dividing line d1 stored beforehand are used for calculation. On the other hand, as for the dividing line angle θ2, since the distance to the dividing line d2 is a discontinuous value, a rate of change of the dividing line angles is calculated at a section where distances to the dividing line have been calculated continuously so as to predict a dividing line angle at a section where distances to the dividing line cannot be calculated. As a result, an error may be accumulated in the dividing line angle at the section where distances to the dividing line cannot be calculated, and values may skip at a part surrounded with 915.

Next, a vehicle yaw angle is calculated as in a solid line 916 using the dividing line angles θ1 and θ2. Herein, since the vehicle yaw angle has a sign defined so that left corning is a plus direction, the vehicle yaw angle is calculated by inverting the sign of the dividing line angle θ1 and by averaging the resultant and a value of the dividing line angle θ2. Similarly to the part surrounded with 915, an error may occur in the dividing line angle at a section where distances to the dividing line cannot be calculated, and therefore values may skip as in a part surrounded with 917.

Next, corrected distances to the dividing lines D1 and D2 are calculated as in a solid line 918 and a dotted line 919, respectively, by Expressions (5) and (6) using the distances to the dividing lines d1 and d2 and the vehicle yaw angle.

Next, when the corrected distance to the dividing line D1 or D2 is a predetermine value or less, 1 (ON) is set at a lane departure warning flag. In this example, when the corrected distance to the dividing line D2 falls below the predetermined value at point C, the lane departure warning flag is turned ON and is turned OFF (set at 0) after a predetermined time. This is because the lane departure warning flag may be ON only during a time when a driver can recognize the warning (e.g., 2 seconds), and even when the corrected distance to the dividing line D2 still falls below the predetermined value at the time of OFF, the flag may be turned OFF (because continuous warning will annoy the driver). A series of values of the lane departure warning flag will change as in a solid line 920.

As described above, a dividing line is detected from an image obtained by capturing a rear of the vehicle to calculate a vehicle yaw angle, and a distance to the dividing line is corrected using the calculated vehicle yaw angle, thus enabling setting of a lane departure warning flag.

Note here that the present embodiment describes an imaging device capturing an image in the rear of a vehicle. However, the imaging device may capture an image in front of the vehicle, and the installation angle or the installation position of the imaging device may be different from those in the present embodiment.

Although the present embodiment uses a least squares method to calculate a dividing line angle, a method other than a least squares method may be used.

The present embodiment describes the example where a distance to a dividing line calculated by an imaging device is corrected to a distance from the outside of a front wheel of the vehicle to the dividing line. However, the distance may be corrected to a distance from any position to the dividing line such as a distance from a front corner of the vehicle to the dividing line.

As stated above, the present invention can be embodied in various forms without departing from the gist of the invention.

DESCRIPTION OF REFERENCE NUMBERS

100 Vehicle attitude angle calculating device
301, 302, 401, 402, 802, 803 Dividing lines
303 to 306 Edge strength peaks
403 Optical axis of imaging device
404 Distance to dividing line 405, 804 Imaging devices
801, 900 Vehicles
901 Traveling path

The invention claimed is:

1. A vehicle attitude angle calculating device, comprising:
a dividing line detection unit that detects a dividing line from image information received from a vehicle-mounted imaging device having an optical axis, the image information being a captured image of an outside of a vehicle;
a distance calculation unit that calculates a distance between the dividing line and the optical axis of the vehicle-mounted imaging device every predetermined processing period; and
a vehicle angle calculation unit,
wherein
the vehicle angle calculation unit includes:
a dividing line angle calculation unit that calculates the dividing line angle on the basis of the calculated distance between the dividing line and the optical axis of the vehicle-mounted imaging device and the vehicle proceeding distance where the vehicle proceeds during a predetermined processing period; and
a vehicle yaw angle calculation unit that calculates a yaw angle of the vehicle with reference to the dividing line on the basis of the calculated dividing line angle,
wherein
the dividing line angle calculation unit determines whether, among distances between the dividing line and the optical axis of the vehicle-mounted imaging device calculated by the distance calculation unit, a latest distance has been calculated or not,
when it is determined that the latest distance has been calculated, the dividing line angle calculation unit determines whether, among a plurality of distances between the dividing line and the optical axis of the vehicle-mounted imaging device calculated by the distance calculation unit, a predetermined first number of distances or more have been calculated or not, and
when it is determined that the predetermined first number of distances or more have been calculated, the dividing line angle calculation unit calculates the dividing line angle on the basis of the calculated plurality of distances.

2. The vehicle attitude angle calculating device according to claim 1, further comprising:
a distance storage unit that stores the distance calculated by the distance calculation unit,
wherein
the vehicle angle calculation unit fetches a plurality of distances from the distance storage unit and calculates the dividing line angle on the basis of the plurality of distances and the vehicle proceeding distance.

3. The vehicle attitude angle calculating device according to claim 1,
wherein
the dividing line angle calculation unit includes:
an angle storage unit that stores past dividing line angles that is calculated by the dividing line angle calculation unit; and
an angle change rate calculation unit that calculates a rate of change of a dividing line angle on the basis of a plurality of dividing line angles stored in the angle storage unit.

4. The vehicle attitude angle calculating device according to claim 1,
wherein
the vehicle angle calculation unit includes a dividing line not-detected number of times measurement unit that measures the number of times when the distance calculation unit continuously fails to calculate a distance between the dividing line and the optical axis of the vehicle-mounted imaging device.

5. The vehicle attitude angle calculating device according to claim 1, further comprising a dividing line angle average unit that averages a plurality of dividing line angles calculated by the vehicle angle calculation unit.

6. The vehicle attitude angle calculating device according to claim 1,
wherein
the vehicle yaw angle calculation unit includes:
a yaw angle storage unit that stores a past plurality of yaw angles calculated by the vehicle yaw angle calculation unit; and
a yaw angle change rate calculation unit that calculates a rate of change of a yaw angle of the vehicle on the basis of a plurality of yaw angles stored in the yaw angle storage unit.

7. The vehicle attitude angle calculating device according to claim 1,
wherein
when it is determined that, among distances between the dividing line and the optical axis of the vehicle-mounted imaging device calculated by the distance calculation unit, the latest distance has not been calculated, or when it is determined that, among a plurality of distances between the dividing line and the optical axis of the vehicle-mounted imaging device calculated by the distance calculation unit, the predetermined first number of distances or more have not been calculated, the dividing line angle calculation unit determines whether, among a plurality of dividing line angles calculated in past, a predetermined second number of dividing line angles or more have been calculated or not, and
when it is determined that, among a plurality of dividing line angles calculated in past, the predetermined second number of dividing line angles or more have been calculated, the dividing line angle calculation unit calculates a rate of change of the dividing line angles on the basis of the calculated plurality of dividing line angles, and predicts the dividing line angle on the basis of the calculated rate of change of the dividing line angles.

8. The vehicle attitude angle calculating device according to claim 1,
wherein
the dividing line includes a pair of left and right lines residing on left and right of the vehicle, and
the distance between the dividing line and the optical axis of the vehicle-mounted imaging device includes a distance between the left line and the optical axis of the vehicle-mounted imaging device and a distance between the right line and the optical axis of the vehicle-mounted imaging device.

9. A lane departure warning system comprising:
a vehicle attitude angle calculating device according to claim 1; and
a lane departure warning device that determines necessity of issuance of warning on lane departure on the basis of the dividing line angle and the distance between the dividing line and the optical axis of the vehicle-mounted imaging device input from the vehicle attitude angle calculating device.

10. The lane departure warning system according to claim 9, wherein the lane departure warning device determines necessity of issuance of warning on lane departure on the basis of the yaw angle of the vehicle and the distance between the dividing line and the optical axis of the vehicle-mounted imaging device input from the vehicle attitude angle calculating device.

11. The lane departure warning system according to claim 10, wherein the lane departure warning device includes:

a distance-to-dividing line correction unit that corrects the distance between the dividing line and the optical axis of the vehicle-mounted imaging device into a distance from an outside of a front wheel of the vehicle to the dividing line on the basis of the yaw angle of the vehicle; and a lane departure warning issuance unit that determines necessity of issuance of warning on lane departure on the basis of the corrected distance to the dividing line.

12. The lane departure warning system according to claim 11, wherein the distance from an outside of a front wheel of the vehicle to the dividing line obtained by correction by the distance-to-dividing line correction unit is calculated on the basis of the distance between the dividing line and the optical axis of the vehicle-mounted imaging device, the yaw angle of the vehicle, a distance from a position where the distance between the dividing line and the optical axis of the vehicle-mounted imaging device is calculated to the front wheel of the vehicle, and a distance from the vehicle-mounted imaging device to the outside of the front wheel of the vehicle.

13. The lane departure warning system according to claim 12, wherein the dividing line includes a pair of left and right lines residing on left and right of the vehicle, and the distance from an outside of a front wheel of the vehicle to the dividing line includes a distance from an outside of a left front wheel of the vehicle to the left line and a distance from an outside of a right front wheel of the vehicle to the right line.

14. The lane departure warning system according to claim 13, wherein when any one of a distance from the outside of the front wheel of the vehicle to the left line and a distance from the outside of the front wheel of the vehicle to the right line becomes a predetermined distance or less, the lane departure warning issuance unit issues lane departure warning.

15. The lane departure warning system according to claim 9, wherein the image information received from the vehicle-mounted imaging device is image information in the rear of the vehicle.

* * * * *